A. F. KELLY.
SPRING SPOKE WHEEL.
APPLICATION FILED FEB. 18, 1918.
1,328,244.
Patented Jan. 13, 1920.
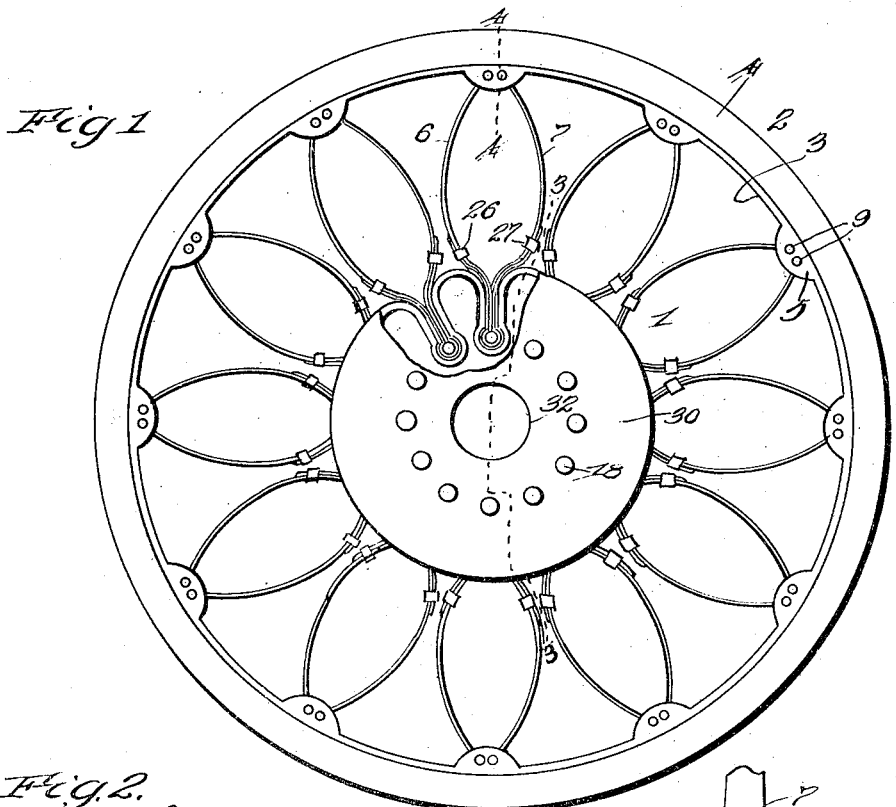
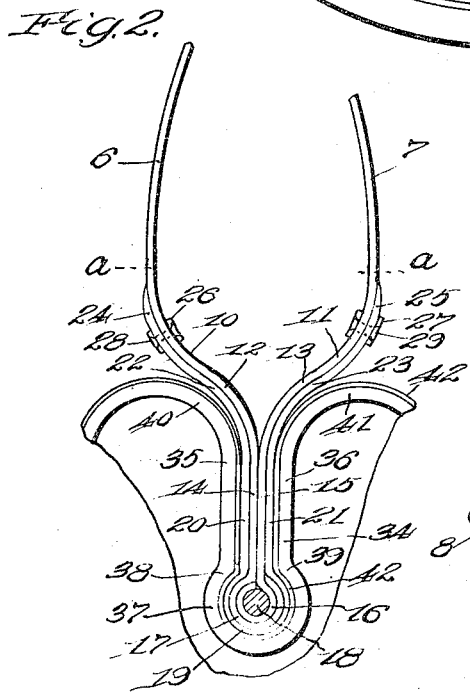
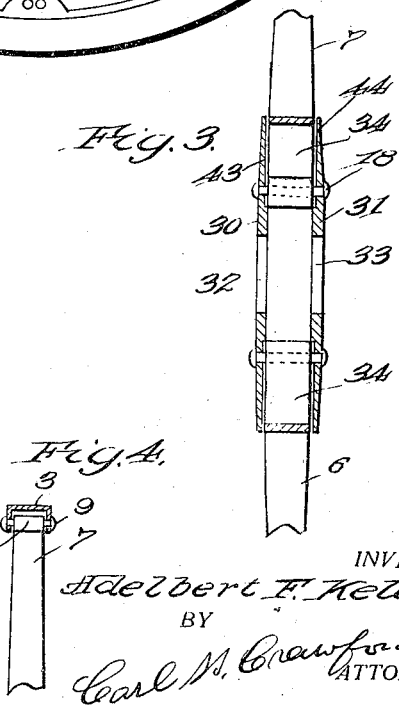
INVENTOR.
Adelbert F. Kelly
BY
Carl M. Crawford
ATTORNEY

UNITED STATES PATENT OFFICE.

ADELBERT F. KELLY, OF SPOKANE, WASHINGTON.

SPRING-SPOKE WHEEL.

1,328,244.  Specification of Letters Patent.  Patented Jan. 13, 1920.

Application filed February 18, 1918. Serial No. 217,801.

*To all whom it may concern:*

Be it known that I, ADELBERT F. KELLY, a citizen of the United States, residing at Spokane, in the county of Spokane and State of Washington, have invented new and useful Improvements in Spring-Spoke Wheels, of which the following is a specification.

This invention relates to improvements in resilient vehicle wheels and has to do more particularly with a spring spoke wheel, in contradistinction to resilient rim wheels.

It is one of the objects of this invention to provide an improved form of spring spoke wherein the lowermost spoke of the wheel is adapted to take the compressive stresses, not only independent of, but supplemented by the uppermost spokes which are designed to resist movement of the hub out of concentricity with the rim by taking a portion of the strain or stress in tension. It is also an object of the invention to provide spokes which will yield laterally to their longitudinal axes when the spokes are in a position other than in a vertical position.

In order to permit the spokes on the lowermost portions of the wheel to effectively take the compressive stress, the hub and spokes are provided with a novel formation whereby the spokes may yield into increasing areas of contact with the hub in such a manner as not to subject the springs to any sharp breaking or bending action. In this connection, and in my most improved construction, the hub is provided with round peripheral spring seating shoulders, and the springs are correspondingly shaped to flatten against either or both of the curved shoulders when the springs are under load.

It is a feature of my invention to provide a hub having radial sockets into which the hub ends of the spring spokes are anchored so that the bending stress of the springs will be imposed on those portions of the same which are between the hub and the felly. Therefore my invention resides in the hub structure, as an article of manufacture, as well as in the hub in combination with other parts forming the wheel.

My improved spring spokes have the stems anchored in the sockets of the hub. Between the hub and the felly, the limbs of the spring spokes are gently but oppositely arched in gradually increasing divergence from the felly toward the hub part way of the length of the spokes, the maximum divergence being nearer the hub than the felly. Thus, irrespective of driving or breaking thrust as applied in either direction to the wheel, one limb of each spring spoke will take the thrust by bending in accordance with its arc whereas the companion limb of such spoke will take the stress by tending to flatten or bend against its arc. The same will be true of those spokes nearly horizontal on the wheel when the load is imposed. It is a feature of my invention to reinforce the spring spokes at portions nearest the hub, although this is not an essential part of my invention, this feature consisting in a reinforcement which extends up to or approximately near to the maximum bow or divergence of the spokes. My invention also relates to this novel form of spring-spoke as an article of manufacture in addition to the invention as a combination.

My invention has other features of novelty which will be more particularly described in connection with the accompanying drawing and which will be more specifically pointed out by the appended claims.

In the drawing:

Figure 1 is a view in side elevation, with parts broken away, of a resilient wheel embodying the preferred form of my invention.

Fig. 2 is a fragmentary view of a portion of the hub and one of the spokes showing the same on an enlarged scale.

Fig. 3 is a sectional view on line 3—3 of Fig. 1.

Fig. 4 is a sectional view on line 4—4 of Fig. 1.

Like characters of reference designate similar parts through the different figures of the drawing.

As illustrated, 1 generally designates hub structure and 2 generally designates the rim. I have shown a rim or felly 3 which I prefer to make rigid and of metal. A tire is generally indicated at 4. Corresponding to the number of spokes employed, the rim 3 is provided with pairs of lugs 5 which are either formed or bent into the plane of the wheel. I employ these lugs for anchoring the outer ends of the spokes thereto. The spokes are of generally U-shaped form and each spoke therefore comprises 2 limb or spring portions 6 and 7. At their outer ends, these limbs are provided with eyes 8, and pivot bolts or rivets 9 are employed to pivotally connect the outer ends of the spokes to the felly. This pivotal connection, while not absolutely essential to my invention, nevertheless affords a greater freedom of resilient action of the spoke and also reduces the liability of breakage, as compared to a rigid connection.

It will be noted that the limb portions 6 and 7 are oppositely arched with respect to each other and that they diverge radially inward toward the hub, the more exact contour being shown in Fig. 2 where the maximum divergence may be indicated by line *a—a*. From this point of maximum divergence the limbs converge as indicated at 10 and 11. The springs are reversely curved throughout the remainder of their convergence, as indicated at 12 and 13 and they are brought into flat abutting relation with each other at 14 and 15. The springs lie in flat abutting relation throughout their remaining inner length of what may be termed the stem portion of their Y-contour, except for their extreme inner ends. Where I employ a spoke composed of two spring portions, as shown, one portion is shaped to form an eye 16 and the other portion is shaped to form an eye 17 which incloses the eye 16. These eyes constitute fastening terminals through which a bolt or rivet device 18 is extended in order to anchor the spoke to the hub.

I prefer to reinforce the spring-spokes nearest the hub, and in the present construction, I employ a reinforcing spring section of generally U-shaped form. The bight of this reinforcing section is indicated at 19 and is extended about the eyes 16 and 17. The reinforcing section extends radially outward in flat abutting relation against the portions 14 and 15, as indicated at 20 and 21, and this reinforcing member likewise takes the convex-concave curvature form as indicated at 22 and 23 and at 24 and 25, up to approximately the maximum point of divergence of the spoke. The reinforcing terminals are preferably connected with the limbs of the spoke by means such as clips 26 and 27. If necessary, I may rivet or otherwise secure the clips to the spoke members as indicated at 28 and 29.

I will next refer to my improved hub structure which as shown comprises sides 30 and 31. These sides have openings 32 and 33 in which any form of hub proper may be secured. It will be seen that the sides 30 and 31 are connected by the bolts or rivets 18. Between the sides is interposed a novel form of spoke holding peripheral portion which has a plurality of sockets indicated at 34 and which are equal in number to the number of spokes employed. These sockets have radially straight parallel and constricted wall portions 35 and 36 which terminate in a semi-cylindrical enlargement 37 in which the eyes 16 and 17 and the bight portion 19 are seated. The resulting shoulders 38 and 39 also assist the rivets 18 in holding the spokes in the sockets. The walls 35 and 36 diverge radially outward on curved lines as indicated at 40 and 41 and the radii of the curved portions 40 and 41 are reduced with respect to the radii of curved portions 12, 13, 22 and 23. Thus there will be formed suitable spaces between the convex shoulder portions of the hub and the adjacent portions of the spring spoke so that when the latter are under compressive stress in the direction of their length, the spokes will flatten into abutting contact against these shoulders thereby relieving the spring spoke of any sharp bending action. When the spoke is in a horizontal position it may bend bodily so that either of its limbs may be flattened against the gentle curvature of its corresponding hub shoulder. When the lowermost vertical spoke is under compressive stress in the direction of its length, the uppermost vertical spoke will be under tension stress in the direction of its length and the lower spoke will be bowed by the load whereas the bow of the upper spoke will be reduced. The clips 27 are of a special importance with the upper spoke in order to bring the reinforcing members into the fullest play as otherwise the reinforcing members would not reinforce the upper spoke under tension stress but would merely permit the latter to bend away from the reinforcing members. This would not be true of the lower spokes but it would apply to the uppermost limbs of the horizontal and other obliquely disposed spokes.

In order to reduce the wearing action on the springs as a result of whatever play they would have against the walls of their sockets, I preferably vulcanize or otherwise surface the socket walls with rubber, fabric or any desired material as indicated at 42. Furthermore, in order to reduce edge play, the sides 30 and 31 are slightly recessed, as indicated at 43 and 44. Because of the rigid anchorage of the spokes in the enlargements 37, by the bolts 18, and by reason of the shoulders 38 and 39, there cannot be much lateral movement of the spring spokes under dishing strains but if the spokes are of the required resiliency, there will be some slight lateral but no radial movement, hence the importance of the recessed sides.

It is believed that the novelty and utility of my invention will be fully understood from the foregoing description, and while I have herein shown and described one specific form, I do not wish to be limited thereto except for such limitations as the claims may import.

I claim:—

1. In a spring spoke wheel, a hub having a plurality of sets of spring spoke seating shoulders and the shoulders of each set being convexly curved and diverging from each other radially outward of the wheel from the longitudinal axis of the spoke therefor, the walls of each set of shoulders extending radially inward of the hub and merging into close parallel relation to form spoke sockets, a bowed spring spoke for each set of shoulders and each spoke having concavely curved shoulder abutment portions converging radially inward of the wheel and toward the longitudinal axis of the spoke and merging into abutting parallel relation radially inward of said shoulders, and said abutting parallel portions of said spokes being in abutting relation with the parallel walls of their respective socket, means for anchoring each spoke in its socket against radial movement therein, and said concavely curved shoulder abutment portions merging into convexly curved bow portions thereby enlarging the bow of each spoke sufficiently closely to the hub to cause the convex bowed portions to closely overhang said hub shoulders whereby not only the concave but also the convex portions of each spoke may flatten against said shoulders when the spoke is under one character of stress.

2. In a spring spoke wheel, a hub having a plurality of sets of spring spoke seating shoulders and the shoulders of each set being convexly curved and diverging from each other radially outward of the wheel from the longitudinal axis of the spoke therefor, the walls of each set of shoulders extending radially inward of the hub and merging into close parallel relation to form spoke sockets and the bottom of each socket having a cylindrical enlargement, a two part bowed spring spoke for each set of shoulders and each spoke having concavely curved shoulder abutment portions converging radially inward of the wheel and toward the longitudinal axis of the spoke and merging into abutting parallel relation radially inward of the shoulders, a bolt extending axially through said enlargement, and one terminal of one part of the spoke being extended about said bolt and the terminal of the remaining part being extended about the terminal of the first named part whereby both terminals will lie in surrounding relation to said bolt in superimposed relation, and a one piece reinforcing spring having its bight extended about said terminals in said enlargement and extending radially outward in said socket in abutting relation with the walls thereof and in abutting relation with said bowed spring members, and the end portions of said reinforcing spring being curved to conform to the curvature of and lying in abutting relation with said concave shoulder abutment portions thereof for direct engagement with the diverging shoulders of said hub.

3. In a spring spoke wheel, a hub having a plurality of sets of spring spoke seating shoulders curving convexly and radially outward from the longitudinal axis of the spoke therefor and each set of shoulders being extended radially inward of the hub to form a socket and the shoulders merging into their respective sockets on gently curved lines and the sockets being relatively contracted to hold the spring spokes radially of the wheel, a spring spoke for each socket and set of shoulders and said spokes being bowed outwardly from their longitudinal axes, said spokes near the hub being convexly curved toward their longitudinal axes and toward their respective shoulders, alongside of said shoulders said spokes being concavely curved and extended into abutting relation for projection into their respective sockets, the concave portions of said spokes being adapted to seat on said shoulders when the spokes are under one kind of stress and having a greater radii than that of said shoulders to normally spring free therefrom, whereby said spokes will be free to yield against said shoulders without being stressed in opposition to their curvature.

4. In a spring spoke wheel, a hub structure having a plurality of sets of spring spoke seating shoulders and each set of shoulders being convexly curved and the shoulders of each set diverging from each other radially outward of the wheel from the longitudinal axis of the spoke therefor, and a bowed spring spoke for each set of shoulders and each spoke having concavely curved shoulder abutment portions converging radially inward of the wheel and toward the longitudinal axis of the spoke and in such relation to said shoulders as to seat on the latter in varying degrees or extents of area contact dependent upon the extent of stress imposed.

5. In a spring spoke wheel, a felly, a hub, and a plurality of bowed spring spokes each comprising a pair of single leaves each having their outer ends pivoted to the felly, the hub having a socket for each spoke, a bolt in each socket, the hub ends of the leaves of each spoke extending into its respective socket and the terminal of one hub end being extended about said bolt and the remaining terminal being extended about said bolt in inclosing relation with the first named terminal, said leaves being in flat abutting relation against each other in said socket, and a reinforcing spring leaf having its bight extended about the outermost of said terminals and extending radially outward in abutting relation along said hub ends through said socket and reinforcing said single leaves for a portion of the distance toward said felly, the free ends of said reinforcing spring leaf being secured to their respective leaves of the spoke.

6. In a spring spoke wheel, a hub structure having a plurality of sets of spring spoke seating shoulders and each set of shoulders being convexly curved and the shoulders of each set diverging from each other radially outward of the wheel from the longitudinal axis of the spoke therefor, and a bowed spring spoke for each set of shoulders and each spoke having concavely curved shoulder abutment portions converging radially inward of the wheel and toward the longitudinal axis of the spoke and adapted to seat on said shoulders when under one kind of stress, and a reinforcing spring section for each spoke extending alongside of and in abutting relation to each curved shoulder abutment portion and being secured thereto to resiliently stiffen said shoulder abutment portions under all stresses to which said abutment portions may be subjected either substantially in the direction of the length of said portions or angular thereto.

In testimony that I claim the foregoing as my own, I hereby affix my signature.

ADELBERT F. KELLY.